United States Patent
Yim et al.

(10) Patent No.: US 11,232,224 B2
(45) Date of Patent: Jan. 25, 2022

(54) DATABASE ENCRYPTION

(71) Applicant: ServiceNow, Inc., Santa Clara, CA (US)

(72) Inventors: Timothy Yim, San Diego, CA (US); Herman Knief, Kirkland, WA (US); James David Wigdahl, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 260 days.

(21) Appl. No.: 15/922,374

(22) Filed: Mar. 15, 2018

(65) Prior Publication Data

US 2019/0286837 A1    Sep. 19, 2019

(51) Int. Cl.
*G06F 21/62* (2013.01)
*G06F 21/60* (2013.01)
*H04L 9/08* (2006.01)
*H04L 29/06* (2006.01)
*G06F 16/21* (2019.01)
*G06F 16/23* (2019.01)

(52) U.S. Cl.
CPC ........ *G06F 21/6227* (2013.01); *G06F 16/211* (2019.01); *G06F 21/602* (2013.01); *H04L 9/0894* (2013.01); *H04L 63/0428* (2013.01); *G06F 16/23* (2019.01)

(58) Field of Classification Search
CPC .. G06F 21/6227; G06F 16/211; G06F 21/602; G06F 16/23; H04L 9/0894; H04L 63/0428; H04L 9/0891; H04L 2209/46; H04L 2209/76
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |

(Continued)

*Primary Examiner* — Jeffrey Nickerson
*Assistant Examiner* — Vadim Savenkov
(74) *Attorney, Agent, or Firm* — Fletcher Yoder PC (57) ABSTRACT

The present approaches generally relate to the encryption of data within a database in such a way that the encrypted data may still be easily accessed and utilized by an application. The present approach provides the ability to encrypt and decrypt data at an application layer though the data remains in an encrypted state at the database layer and when in transit.

18 Claims, 3 Drawing Sheets

(56) References Cited

U.S. PATENT DOCUMENTS

| | | | | |
|---|---|---|---|---|
| 7,925,981 | B2 | 4/2011 | Pourheidar | |
| 7,930,396 | B2 | 4/2011 | Trinon | |
| 7,933,927 | B2 | 4/2011 | Dee | |
| 7,945,860 | B2 | 5/2011 | Vambenepe | |
| 7,966,398 | B2 | 6/2011 | Wiles | |
| 8,051,164 | B2 | 11/2011 | Peuter | |
| 8,082,222 | B2 | 12/2011 | Rangarajan | |
| 8,224,683 | B2 | 7/2012 | Manos | |
| 8,266,096 | B2 | 9/2012 | Navarrete | |
| 8,380,645 | B2 | 2/2013 | Kowalski | |
| 8,402,127 | B2 | 3/2013 | Solin | |
| 8,457,928 | B2 | 6/2013 | Dang | |
| 8,478,569 | B2 | 7/2013 | Scarpelli | |
| 8,554,750 | B2 | 10/2013 | Rangaranjan | |
| 8,612,408 | B2 | 12/2013 | Trinon | |
| 8,646,093 | B2 | 2/2014 | Myers | |
| 8,674,992 | B2 | 3/2014 | Poston | |
| 8,689,241 | B2 | 4/2014 | Naik | |
| 8,743,121 | B2 | 6/2014 | De Peuter | |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Mueller | |
| 8,887,133 | B2 | 11/2014 | Behnia | |
| 9,015,188 | B2 | 4/2015 | Behne | |
| 9,037,536 | B2 | 5/2015 | Vos | |
| 9,065,783 | B2 | 6/2015 | Ding | |
| 9,098,322 | B2 | 8/2015 | Apte | |
| 9,122,552 | B2 | 9/2015 | Whitney | |
| 9,137,115 | B2 | 9/2015 | Mayfield | |
| 9,239,857 | B2 | 1/2016 | Trinon | |
| 9,317,327 | B2 | 4/2016 | Apte | |
| 9,323,801 | B2 | 4/2016 | Morozov | |
| 9,363,252 | B2 | 6/2016 | Mueller | |
| 9,412,084 | B2 | 9/2016 | Kowalski | |
| 9,467,344 | B2 | 10/2016 | Gere | |
| 9,535,737 | B2 | 1/2017 | Joy | |
| 9,613,070 | B2 | 4/2017 | Kumar | |
| 9,645,833 | B2 | 5/2017 | Mueller | |
| 9,654,473 | B2 | 5/2017 | Miller | |
| 9,659,051 | B2 | 5/2017 | Hutchins | |
| 9,766,935 | B2 | 9/2017 | Kelkar | |
| 9,792,387 | B2 | 10/2017 | George | |
| 9,805,322 | B2 | 10/2017 | Kelkar | |
| 9,852,165 | B2 | 12/2017 | Morozov | |
| 10,002,203 | B2 | 6/2018 | George | |
| 10,181,049 | B1* | 1/2019 | El Defrawy | G06F 21/6227 |
| 10,255,454 | B2* | 4/2019 | Kamara | G06F 21/6218 |
| 10,629,296 | B2* | 4/2020 | Soon-Shiong | H04L 9/008 |
| 2006/0155689 | A1* | 7/2006 | Blakeley | G06F 16/284 |
| 2007/0180275 | A1* | 8/2007 | Metzger | G06F 21/6227 713/194 |
| 2010/0057702 | A1* | 3/2010 | Ghosh | G06F 16/2228 707/E17.135 |
| 2011/0238978 | A1* | 9/2011 | Majumdar | H04L 63/0428 713/152 |
| 2013/0297654 | A1* | 11/2013 | Khimich | G06F 21/6227 707/783 |
| 2014/0281511 | A1* | 9/2014 | Kaushik | G06F 21/602 713/164 |
| 2015/0213079 | A1* | 7/2015 | Shukla | G06F 16/2365 707/687 |
| 2016/0105402 | A1* | 4/2016 | Soon-Shiong | G06F 21/6245 713/164 |
| 2017/0026342 | A1 | 1/2017 | Sidana et al. | |
| 2017/0115968 | A1* | 4/2017 | Fukala | G06F 16/252 |
| 2017/0139995 | A1* | 5/2017 | Mielenhausen | G06F 16/22 |
| 2018/0096166 | A1* | 4/2018 | Rogers | H04W 12/02 |
| 2018/0165462 | A1* | 6/2018 | Harris | G06Q 20/3823 |
| 2018/0260400 | A1* | 9/2018 | Vickers | G06F 16/2456 |
| 2018/0357427 | A1* | 12/2018 | Lindell | G06F 16/2455 |
| 2019/0005248 | A1* | 1/2019 | Krishnamurthy | G06F 16/951 |

* cited by examiner

DATABASE ENCRYPTION

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of data may be organized and stored in databases that are created, stored, and maintained on different types of computer-based systems. Such databases may be used to store data ranging from personal information or data developed in large-scale industrial, commercial, and governmental contexts. Thus, such stored data sets may range from the trivially small in size to those that may encompass tens millions of records and data points, or more.

Protection of the data stored in a database may be a concern for an owner and/or user of the data. Existing schemes present various problems in terms of protecting the data stored in a database while still being able to meaningfully and easily access and use the data for approved purposes. That is, there are typically trade-offs between the protecting the data, such as via encryption of the data within the database (i.e., at rest) and being able to easily query or access the data while maintaining some degree of security.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approaches generally relate to the encryption of data within a database in such a way that the encrypted data may still be easily accessed and utilized by an application. In particular, the present approach provides the ability to encrypt and decrypt data (e.g., customer data, patient data, personnel data, and so forth) at an application layer. The data is encrypted before it is sent from an application to a database for secure storage and can be decrypted at the application for the application to operate on without being decrypted outside the application layer (e.g., without being decrypted at the database layer or in transit).

In addition to application layer encryption and decryption, the database is able to perform certain operations on the encrypted data such as comparisons and substring searches. This functionality is provided, in one implementation using secure multi-party computation (SMPC) servlet functionality that allows communication with the database via function calls to complete the requested operations on the encrypted data.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in greater detail below, the present approach provides for the encryption of data within a database in such a way that the encrypted data may still be easily accessed and utilized by an application. In particular, the present approach provides the ability to encrypt and decrypt data (e.g., customer data) at the application layer. The data is encrypted before it is sent from an application to a database for secure storage and can be decrypted for the application to operate on. In addition to application layer encryption and decryption, the database is able to perform certain operations on the encrypted data such as comparisons and substring searches. This functionality is provided, in one implementation, by a set of daemons that are configured to communicate with the database via function calls to complete the requested operations on the encrypted data. In one embodiment, the encryption system, including encryption key management and rotation, is configured and tracked via a set of data tables (e.g., configuration tables for metadata and schema mapping) stored on the database. The present approach is in contrast to certain prior approaches that employ an intervening encryption proxy positioned within the communication channel between the application layer and database layer.

Figure 1:
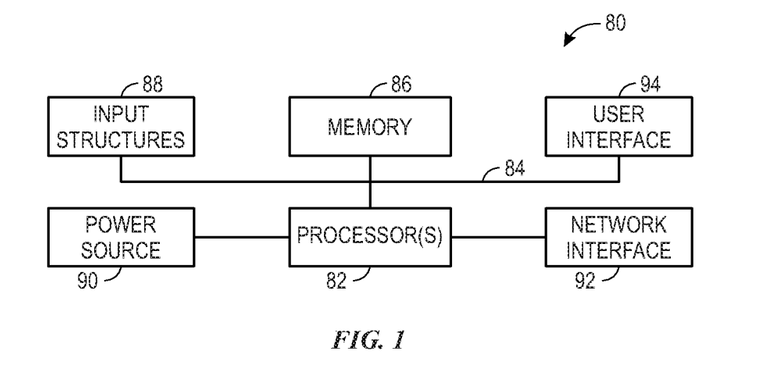
FIG. 1 is a block diagram of a computing device utilized in a distributed computing system of FIG. 1, in accordance with aspects of the present disclosure.

With this in mind, and by way of background, it may be appreciated that the present approach may be implemented using one or more processor-based systems such as shown in FIG. 1. Likewise, the databases to which the present approach applies may be stored and maintained on such processor-based systems. As may be appreciated, such systems as shown in FIG. 1, in implementing the present approach, may be present in a distributed computing environment, a networked environment, or other multi-computer platform or architecture. Likewise, systems such as that shown in FIG. 1, may be used in supporting or communicating with one or more virtual server environments or instances on which the present approach may be implemented.

With this in mind, an example computer system may include some or all of the computer components depicted in FIG. 1. FIG. 1 generally illustrates a block diagram of example components of a computing device 80 and their potential interconnections or communication paths, such as along one or more busses. The computing device 80 may be an embodiment of a client, an application server, a database server, and so forth, as discussed in greater detail below. As used herein, a computing device 80 may be implemented as a computing system that includes multiple computing devices and/or a single computing device, such as a mobile phone, a tablet computer, a laptop computer, a notebook computer, a desktop computer, a server computer, and/or other suitable computing devices.

As illustrated, the computing device 80 may include various hardware components. For example, the device includes one or more processors 82, one or more busses 84, memory 86, input structures 88, a power source 90, a network interface 92, a user interface 94, and/or other computer components useful in performing the functions described herein.

The one or more processors 82 may include processor(s) capable of performing instructions stored in the memory 86. For example, the one or more processors 82 may include microprocessors, system on a chips (SoCs), or any other performing functions by executing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86. Moreover, the functions of the one or more processors 82 may be distributed across multiple processors in a single physical device or in multiple processors in more than one physical device. The one or more processors 82 may also include specialized processors, such as a graphics processing unit (GPU).

The one or more busses 84 includes suitable electrical channels to provide data and/or power between the various components of the computing device. For example, the one or more busses 84 may include a power bus from the power source 90 to the various components of the computing device. Additionally, in some embodiments, the one or more busses 84 may include a dedicated bus among the one or more processors 82 and/or the memory 86.

The memory 86 may include any tangible, non-transitory, and computer-readable storage media. For example, the memory 86 may include volatile memory, non-volatile memory, or any combination thereof. For instance, the memory 86 may include read-only memory (ROM), randomly accessible memory (RAM), disk drives, solid state drives, external flash memory, or any combination thereof. Although shown as a single block in FIG. 1, the memory 86 can be implemented using multiple physical units in one or more physical locations. The one or more processors 82 access data in the memory 86 via the one or more busses 84.

The input structures 88 provide structures to input data and/or commands to the one or more processor 82. For example, the input structures 88 include a positional input device, such as a mouse, touchpad, touchscreen, and/or the like. The input structures 88 may also include a manual input, such as a keyboard and the like. These input structures 88 may be used to input data and/or commands to the one or more processors 82 via the one or more busses 84.

The power source 90 can be any suitable source for power of the various components of the computing device 80. For example, the power source 90 may include line power and/or a battery source to provide power to the various components of the computing device 80 via the one or more busses 84.

The network interface 92 is also coupled to the processor 82 via the one or more busses 84. The network interface 92 includes one or more transceivers capable of communicating with other devices over one or more networks (e.g., a communication channel). The network interface 92 may provide a wired network interface or a wireless network interface. The computing device 80 may communicate with other devices via the network interface 92 using one or more network protocols.

A user interface 94 may include a display that is configured to display text or images transferred to it from the one or more processors 82. By way of example, in the present context, the user interface may be used to provide a set of query results (e.g., selected database records) to a user. In addition and/or alternative to the display, the user interface 114 may include other devices for interfacing with a user, such as lights (e.g., LEDs), speakers, and the like.

Figure 2:
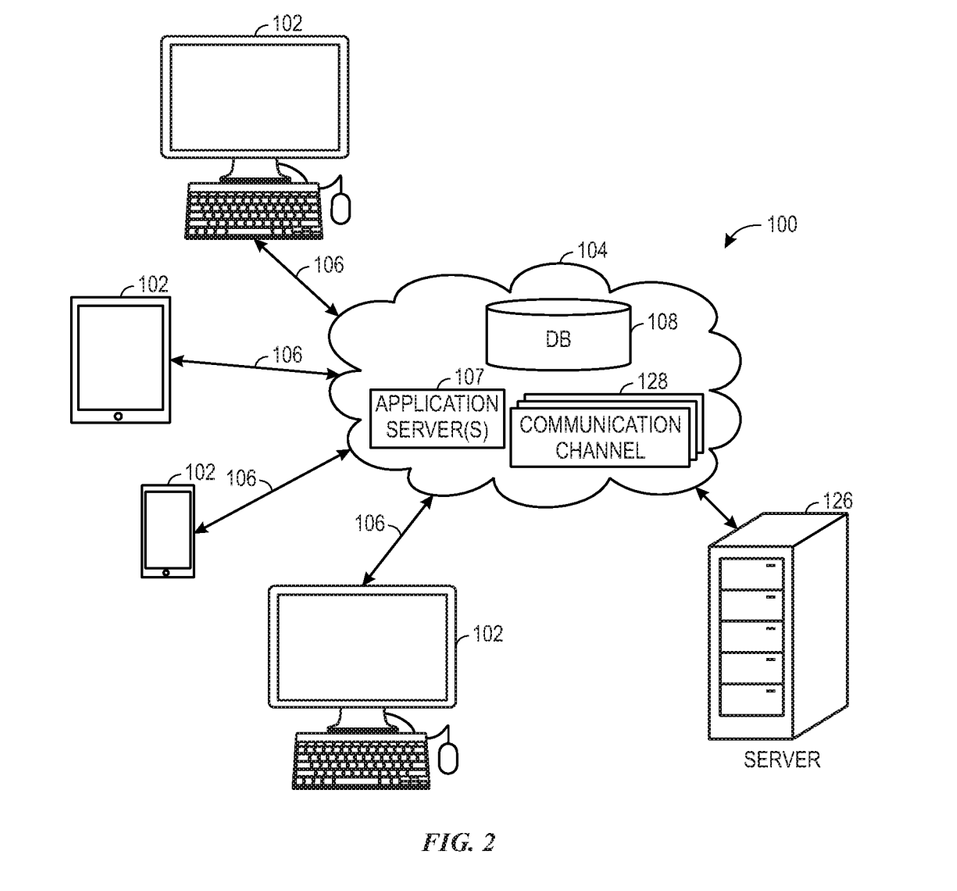
FIG. 2 is a block diagram of a distributed computing system, in accordance with aspects of the present disclosure.

A real-world context in which processor-based systems, such as the computing device 80 of FIG. 1, may be employed to implement the present approach, is shown in FIG. 2. In this example, a number of computing devices are employed to implement a distributed computing framework 100, shown as a block diagram in FIG. 2, in which certain of the constituent devices may maintain or interact with a database, such as via an application running on the respective devices (e.g., clients 102), in accordance with the approach discussed herein.

In this example, one or more clients 102 communicate with a platform (e.g., a cloud service) 104 over a communication channel 106. Each client 102 may include any suitable computing system, such as a mobile phone, a tablet computer, a laptop computer, a notebook computer, a desktop computer, or any other suitable computing device or combination of computing devices. Each client 102 may include client application programs running on the computing devices. In the present example, one or more of the clients may be suitable for interacting with (e.g., implementing a query, creating or deleting records, and so forth) a database (e.g., database 108) accessible on the distributed computing framework 100.

The platform (e.g., a cloud service) 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only four clients 102 are shown connected to the platform 104 in the depicted example, it should be noted that platform 104 may connect to any number of clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The database 108 may include a series of tables containing information accessed or modified by such application programs. Examples of such information may include customer data, product data, infrastructure, data, and so forth. As used herein a database 108 may be any type of database suitable for being queried and/or may store any suitable type of information.

Additional to or in place of the database 108, the platform 104 may include one or more other database servers. The database servers are configured to store, manage, or otherwise provide data for delivering services to the client 102 over the communication channel 106. The database server includes one or more databases (e.g., DB 108) that are accessible by the application server 107, the client 102, and/or other devices external to the databases. In some embodiments, more than a single database server may be utilized. Furthermore, in some embodiments, the platform 104 may have access to one or more databases external to the platform 104 entirely, such as a database stored or otherwise present on a client 102.

Access to the platform 104 is enabled by a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on a network that communicates with the platform 104.

With the preceding system and device level background in mind, the present approach relates to techniques for storing data in an encrypted form in a database, with encryption and decryption occurring in the application. The present approach retains the ability of a user to selectively access the encrypted data, however, such as by running queries, though the data remains encrypted at the database level.

A database as discussed herein may consist of a number of tables, which are often defined based on some logical characteristic common to the records stored in the table (e.g., address information in an address table of a mailing database, error events in an error table of an event log, vehicles in a vehicle table of a registration database, and so forth). Each table in turn is characterized by a number of records for which one or more different types of data are stored in respective fields of the table. By way of example, in a vehicle registration database one table may have a record for each registered vehicle, with each vehicle record having associated fields for storing information specific to the respective vehicle (e.g., vehicle year, make, model, color, identification number, and so forth). In such an example, other tables may exist in the same database containing owner information, accident information, repair history, recall notices and so forth, with each table having its own set of records which in turn have respective fields related to the records within that table. In a relational database context, these tables may be linked together based on known relationships between tables (e.g., between owners and vehicles), allowing the stored data to be accessed or manipulated in useful ways.

Typically each table is indexed by one or more fields of the respective table. Use of such indexes allows the records of the table to be more readily searched, manipulated, or otherwise accessed. For the purpose of explanation and visualization, a table may conceptualized as records in rows within the table (i.e., run vertically within the table) and the different fields of data for each record are columns (i.e., run horizontally within the table). As will be appreciated however, such directionality and two-dimensionality is an arbitrary convention and should not be viewed as limiting.

With the preceding multi-table database framework in mind, and as noted above, the present approach relates to encrypting data stored in certain tables of a database (e.g., client, patient, or customer data). As discussed herein, in certain implementations, other tables may also be present in the database in an encrypted or unencrypted form, such as configuration tables storing metadata, schema mapping, and so forth.

Prior to discussing the present approach, two alternative schemes will be described to better appreciate the benefits of the present approach. For example, turning to FIG. 3, in one approach an encryption proxy 140 is positioned in the communication path between the application layer (e.g., application 142) and the database layer (e.g., database 108) such that access to encrypted data on the database 108 by the application 140 is via the encryption proxy 140. In this example, the encryption proxy 140 handles encryption and decryption of the data and a secure multi-party computation (SMPC) servlet 146 handles comparison functions to respond to queries and operations performed on the encrypted stored data. A conventional application programming interface (API) may be employed as a database driver to connect the application 142 to the database 108 via the encryption proxy 140. In the depicted example, a conventional Java database connectivity (JDBC) API is employed as the connector 148. In one approach, schema mapping is file based and handled on the encryption proxy 140.

Figure 3:
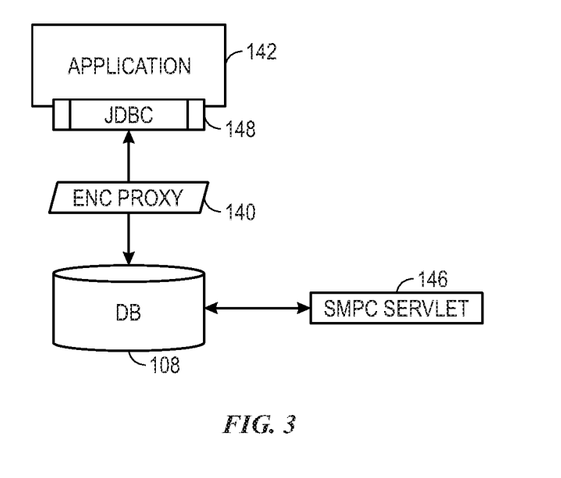
FIG. 3 is a schematic illustration of a multi-layer database encryption approach.

One issue related to the approach shown in FIG. 3, is the necessity of employing an encryption proxy 140, which constitutes an additional point of potential failure or attack within the framework. Thus, use of the proxy increases complexity, increases the number of features that must be maintained and updated, and introduces a span in which the data is unencrypted in transit, i.e., between the encryption proxy 140 and the application 142. For at least these reasons, it may be desirable to have an alternative database encryption framework.

Figure 4:
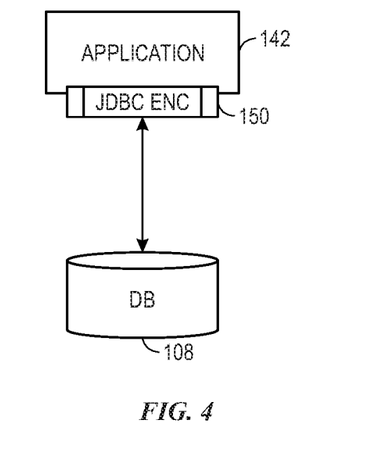
FIG. 4 is a schematic illustration of a further multi-layer database encryption approach.

Turning to FIG. 4, one other alternative is depicted. In this example, encryption functionality is incorporated into the connector, i.e., into the API, denoted in FIG. 4 by reference number 150. By way of example, an encryption-functionalized connector 150 may be an open-source JDBC driver coded to provide encryption capabilities in addition to the base functionality. In this example, the encryption connector 150 (depicted as JDBC Enc in FIG. 4) handles encryption and decryption of data at the application layer. Schema mapping may be stored locally at the application layer or in tables on the database 108 (e.g., a schema mapping configuration table). This approach also adds complexity in terms of needing to construct and maintain a special-purpose connector but allows for encryption throughout transit with no lapse. Another potential issue with this approach is it provides no support for external functions and provides limited search capability with respect to the encrypted data stored on the database.

With the preceding alternative examples in mind, and as discussed in general above, the present approach provides for the encryption of data (e.g., customer data, patient data, client data, and so forth) before it is sent to the database 108 for secure storage and for the ability to decrypt the same data so the application 142 can operate on it. As discussed herein, the database 108 remains able to perform certain operations on the stored encrypted data, including, but not limited to, comparisons and substring searches. In one implementation, this functionality is provided by a set of daemons that are configured to communicate with the database 108 via function calls to complete the requested operations on the encrypted data. In one embodiment, the encryption system, including encryption key management and rotation, is configured and tracked via a set of data tables stored on the database. For example, the set of tables may be a set of configuration tables used to separately store metadata and schema mapping with respect to the stored data.

Figure 5:
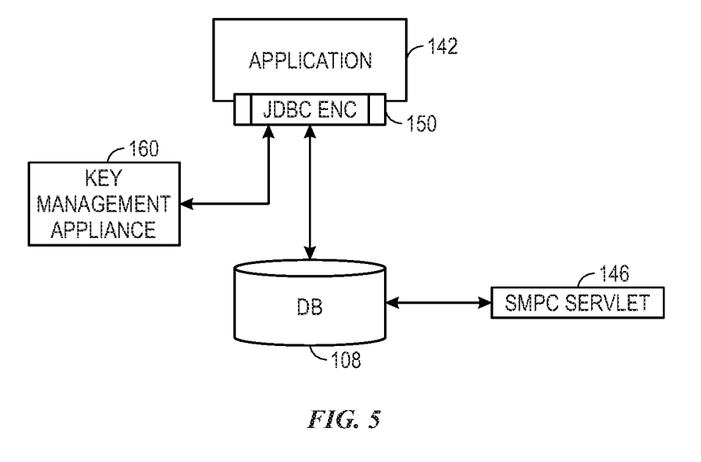
FIG. 5 is a schematic illustration of an additional multi-layer database encryption approach, in accordance with aspects of the present disclosure.

The present approach may be conceptualized and explained as a multi-layer implementation, having an application layer, a database layer, and a secure multi-party computation (SMPC) layer. With reference to FIG. 5, in one approach the application layer (e.g., the application 142 and encryption-functionalized connector 150) will have encryption and decryption hooks built into the connector (e.g., JDBC API) such that the API handles encryption and decryption calls at the interface of the application 142. In such an approach the application 142 need not be modified to take advantage of the encryption and decryption API hooks, as this will be handled by the encryption-functionalized connector 150 in a manner transparent to the application 142, i.e., the application 142 will handle and operate on unencrypted data, such as at a client device 102 of FIG. 2. For example, in one such implementation the encryption and decryption functionality built into the encryption-functionalized connector 150 is used to call out to separate encryption and decryption libraries that provide the encryption functionality without a separate encryption proxy.

In one embodiment, the application 142 creates and maintains the overall configuration of the database using the metadata and schema map stored on the database 108, such as in separate configuration tables within the database 108 such that the relationships between tables, table indexes, table fields, field parameters, and so forth is known to the application. This allows the application 142 to be fully customizable for encryption and decryption on selective tables and columns of the database 108 using the information within these configuration tables. That is, the application can reference the metadata and schema mapping information stored on the database 108 in order to selectively access encrypted data stored in the database 108 without knowing the contents of the referenced data.

In addition, encryption key management and key rotation also is handled at the application layer, such as via interaction with a key management appliance 160 that stores the encryption keys. In such an embodiment, the encryption related hooks within the encryption-functionalized connector 150 provide the interface to the key management systems. In one implementation, the configuration that allows the application layer to communicate with the key management appliance 160 through the API hooks is also stored in the configuration tables on the database 108.

With respect to what may be construed as the database layer, this layer may be broadly understood as encompassing a database 108 for encrypted data storage as well as the configuration table(s) noted above. In accordance with the present approach, the database 108 is not able to read the stored encrypted data since the database 108 does not have access to the decryption key (stored in key management appliance 160). As a result, the database 108 does not have the ability to act in a directed manner (i.e., to access or modify particular, columns, rows, fields, tables, or records) on the stored encrypted data. Instead, the primary function of the database 108 is to store and retrieve the data in its encrypted form.

To facilitate access in a directed manner to the encrypted data stored in the database 108, the database 108 may be modified to override certain function calls for data comparison by loading in a custom user defined function plugin. In the depicted example, the plugin will accept specific requests from the database 108 and pass these calls out to the secure multiparty computation (SMPC) layer (discussed below), to perform computational analysis on the data received. The database 108 will then return records to the application 142 based on the response back from the SMPC layer. That is, certain function calls received by the database 108 (such as calls directed to accessing, selecting, or otherwise returning select data that is encrypted) are passed by the database 108 to the SMPC layer, which is capable of performing directed operations on the encrypted data. The selected encrypted data provided back to the database 108 from the SMPC layer can be returned as a response to the application 142 while still in an encrypted form.

Thus, the SMPC layer is responsible for receiving and processing certain data functionality requests from the database 108 and to maintain data security by preserving encryption at the database layer the SMPC layer. In the implementation shown in FIG. 5, the SMPC layer is embodied as an SMPC servlet 146 (e.g., a class, such as a Java programming language class, that responds to a network request, such as a request implemented via a request-response programming model) that provides the ability to perform functions (e.g., processes) on the encrypted data itself without decrypting the data, so that the data is never decrypted in the database layer or the SMPC layer. For example, the SMPC servlet 146 may be comprised of a configurable amount of running processes that work in combination to achieve the desired functionality. This functionality may include the ability to handle arbitrary processing by combining SMPC algorithms of basic logical operations (e.g., "AND", "XOR", "OR", "NOT", and so forth). Use of the SMPC servlet 146 allows the encrypted data stored in the database 108 to be processed in encrypted form and returns a result to the application 142 in encrypted form, with no break in the encryption. In the embodiment depicted in FIG. 5, the encrypted result to a query can then be decrypted for use by the application by the encryption-functionalized connector 150, which has access to the decryption keys stored in the key management appliance 160.

Thus, in accordance with this example, an application 142 may maintain metadata (e.g., searchable tags or field descriptors) and schema mappings in an encrypted or unencrypted form in configuration tables on the database 108.

Other data in the database 108 (such, as customer data, client data, patient data, and so forth) is stored in an encrypted form. Data sent from the application 142 to the database 108, such as to add a record to a table, may be encrypted at the encryption-functionalized connector 150 so as to be encrypted in transit and while stored in the database 108 and the application 142 can correspondingly update the configuration tables stored on the database 108 to reflect the changes to the stored data.

The application 142 can use the information present in the accessible configuration tables to formulate requests for and/or to perform operations on selected data of the encrypted data, such as to return or modify data based on row, column, table, field, record and so forth. In this manner, the application can access, manipulate, or otherwise operate on specific data needed to perform an operation. Thus, based on a user request to access or operate on one select records, the application 142 may formulate a request to perform an operation based on the schema mapping and metadata stored in the configuration tables on the database 108. Upon receipt of the request, the database 108 may convey the request to the SMPC servlet, which is configured to parse the logical operations present in the request and perform the operations on the specified encrypted data while the data remains in an encrypted form. The result returned from the request processed by the SMPC servlet is also encrypted, so that the data at the database layer is not unencrypted at any time while outside the application layer. The encrypted result is returned to the application 142 and decrypted at the encryption-functionalized connector 150 so as to be unencrypted for use in the application layer.

Figure 6:
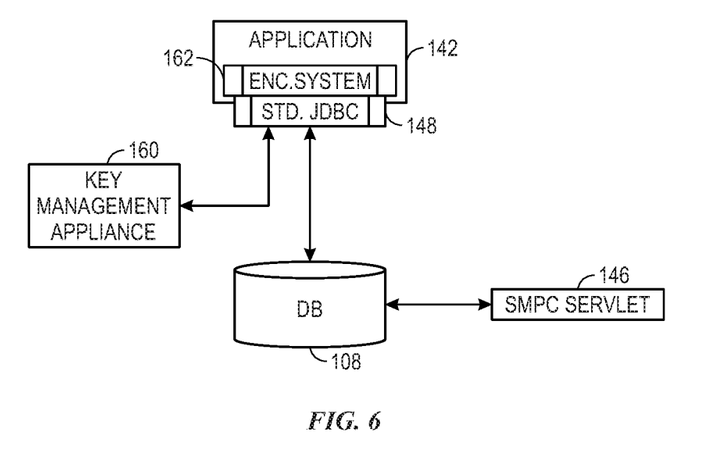
FIG. 6 is a schematic illustration of a further multi-layer database encryption approach, in accordance with aspects of the present disclosure.

In a further implementation, illustrated in FIG. 6, the connector 148 may be a conventional or standard connector 148 (e.g., a JDBC API) without added encryption functionality. In such an approach, the encryption functionality may instead be coded into the application 142, such as part of an encryption system 162 or module within the application that mediates the communication of encrypted data between the connector 148 and the application 142. Thus, in this implementation, encryption and decryption of data (both inbound and outbound to the application 142) is handled by the encryption system 162 of the application 142. In such an approach, communication with the key management appliance 160 may be by the application 142, since the application 142 includes the encryption system 162. In other respects, the approach shown in FIG. 6 is similar to that discussed with respect to FIG. 5.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A database encryption framework implemented across a plurality of computing devices, comprising:
a database server configured to store and manage a database layer comprising at least one database, the database comprising:
one or more content tables that store application data in an encrypted state;
a first configuration table that stores metadata describing attributes of the application data, wherein the metadata comprises searchable tags, field descriptors, or both;
a second configuration table that stores a schema mapping of the application data in the database; and
a plugin configured to:
receive a function call from an application associated with an application layer to perform computational analysis to the one or more content tables; and
convey the function call to a secure multi-party computation (SMPC) layer for performing the computational analysis;
an application server configured to store and manage the application layer, comprising:
the application configured to:
maintain the metadata and schema mapping in the first and second configuration tables stored in the database;
reference the metadata and schema mapping stored on the database to selectively access encrypted data stored in the database; and
access the application data stored in the database, wherein the application can selectively access application data in the database based on the metadata and schema mapping in the first and second configuration tables stored in the database; and
an application programing interface (API) connector comprising encryption and decryption functionality that encrypts and decrypts application data transmitted to and from the database, wherein application data transmitted between the API connecter and the database is in the encrypted state and application data transmitted between the API connecter and the application is in a decrypted state; and
the SMPC layer configured to communicate with the database and receive the function call via the plugin to perform computational analysis on the one or more content tables to allow requested data to be selected and transmitted to the application in the encrypted state, based on the metadata and schema mapping in the first and second configuration tables stored in the database and without directly communicating with the application server.

2. The database encryption framework of claim 1, wherein the SMPC layer comprises an SMPC servlet configured to perform functions on the application data in the encrypted state without decrypting the application data.

3. The database encryption framework of claim 1, wherein the database is maintained in a client instance remotely accessed by the application.

4. The database encryption framework of claim 1, wherein the API connector comprises a Java Database Connectivity (JDBC) connector having encryption and decryption functionality.

5. The database encryption framework of claim 1, further comprising a key management appliance in communication with the API connector, wherein the key management appliance is configured to store encryption keys for the application data stored in the database.

6. A database encryption framework implemented across a plurality of computing devices, comprising:
   a database server configured to store and manage a database layer comprising at least one database, the database comprising:
      one or more content tables that store application data in an encrypted state;
      a first configuration table that stores metadata describing attributes of the application data, wherein the metadata comprises searchable tags, field descriptors, or both;
      a second configuration table that stores schema mapping of the application data in the database; and
      a plugin configured to:
         receive a function call from an application associated with an application layer to perform computational analysis to the one or more content tables; and
         convey the function call to a secure multi-party computation (SMPC) layer for performing the computational analysis;
   an application server configured to store and manage the application layer, comprising:
      an application programing interface (API) connector; and
      the application configured to:
         maintain the metadata and schema mapping in the first and second configuration tables stored in the database via the API connector;
         reference the metadata and schema mapping stored on the database to selectively access encrypted data stored in the database; and
         access the application data stored in the database via the API connector, wherein the application can selectively access application data in the database based on the metadata and schema mapping in the first and second configuration tables stored in the database;
      wherein the application comprises an encryption system configured to communicate with the API connector, wherein the encryption system is configured to encrypt and decrypt application data transmitted to and from the database, wherein application data transmitted between the application and the database is in the encrypted state; and
   the SMPC layer configured to communicate with the database and receive the function call via the plugin to perform computational analysis on the one or more content tables to allow requested data to be selected and transmitted to the application in the encrypted state, based on the metadata and schema mapping in the first and second configuration tables stored in the database and without directly communicating with the application server.

7. The database encryption framework of claim 6, wherein the SMPC layer comprises an SMPC servlet configured to perform functions on the application data in the encrypted state without decrypting the application data.

8. The database encryption framework of claim 6, wherein the database is maintained in a client instance remotely accessed by the application.

9. The database encryption framework of claim 6, wherein the API connector comprises a Java Database Connectivity (JDBC) connector.

10. The database encryption framework of claim 6, further comprising a key management appliance in communication with the application, wherein the key management appliance is configured to store encryption keys for the application data stored in the database.

11. A method for managing encrypted communication, comprising:
   storing application data in an encrypted state in one or more content tables of a database, wherein the database comprises a plugin configured to receive one or more function calls from an application associated with an application server to perform computational analysis on the one or more content tables and convey the one or more function calls to a secure multi-party computation (SMPC) layer for performing the computational analysis;
   receiving inputs to the application corresponding to instructions for selectively accessing the encrypted application data stored in the database based on referencing metadata and schema mapping stored in the database by the application, wherein the metadata and the schema mapping are maintained by the application, wherein the metadata comprises searchable tags, field descriptors, or both;
   in response to the inputs, utilizing an application programing interface (API) connector comprising encryption and decryption functionality to encrypt and decrypt application data transmitted to and from the database such that application data transmitted between the API connector and the database is in the encrypted state and application data transmitted between the API connecter and the application is in a decrypted state; and
   in response to the inputs, transmitting the one or more function calls received by the database from the application to the SMPC layer via the plugin to perform computational analysis associated with the function calls against one or more content tables of the database to allow requested data to be selected and transmitted to the application in the encrypted state, based on the metadata and schema mapping stored in the database and without directly communicating with the application server.

12. The method of claim 11, wherein the SMPC layer comprises an SMPC servlet configured to perform functions on the application data in the encrypted state without decrypting the application data.

13. The method of claim 11, wherein the database is maintained in a client instance remotely accessed by the application.

14. The method of claim 11, wherein the API connector comprises a Java Database Connectivity (JDBC) connector having encryption and decryption functionality.

15. A method for managing encrypted communication, comprising:
   storing application data in an encrypted state in one or more content tables of a database, wherein the database comprises a plugin configured to receive one or more function calls from an application associated with an application server to perform computational analysis on the one or more content tables and convey the one or more function calls to a secure multi-party computation (SMPC) layer for performing the computational analysis;
   receiving inputs to the application corresponding to instructions for selectively accessing the encrypted application data stored in the database based on referencing metadata and schema mapping stored in the database by the application, wherein the metadata and the schema mapping are maintained by the application, wherein the metadata comprises searchable tags, field descriptors, or both;

in response to the inputs, utilizing an encryption system provided as part of the application and configured to communicate with an API connector, wherein the encryption system is configured to encrypt and decrypt application data transmitted to and from the database and wherein application data transmitted between the application and the database is in the encrypted state, based on the metadata and schema mapping stored in the database; and in response to the inputs, transmitting the one or more function calls received by the plugin from the application to the SMPC layer via the plugin to perform computational analysis associated with the function calls against one or more content tables of the database to allow requested data to be selected and transmitted to the application in the encrypted state based on the metadata and schema mapping stored in the database and without directly communicating with the application server.

16. The method of claim 15, wherein the database is maintained in a client instance remotely accessed by the application.

17. The method of claim 15, wherein the API connector comprises a Java Database Connectivity (JDBC) connector.

18. The method of claim 15, wherein the SMPC layer comprises an SMPC servlet configured to perform functions on the application data in the encrypted state without decrypting the application data.

* * * * *